Oct. 25, 1966

H. A. WAYNE 3,281,690

METER MOVEMENT INCLUDING A TRANSVERSITY
MAGNETIZED, ECCENTRICALLY PIVOTED
PERMANENT MAGNET DISC ROTOR

Filed June 26, 1961

INVENTOR:
Harry A. Wayne,
BY
Bair, Freeman & Molinare
ATTORNEYS.

United States Patent Office 3,281,690
Patented Oct. 25, 1966

3,281,690
METER MOVEMENT INCLUDING A TRANSVERSELY MAGNETIZED, ECCENTRICALLY PIVOTED PERMANENT MAGNET DISC ROTOR
Harry A. Wayne, 4120 W. Greenwood, Skokie, Ill.
Filed June 26, 1961, Ser. No. 119,575
5 Claims. (Cl. 324—146)

This application relates generally to electric motors and more particularly to a new and improved electric motor characterized by its high torque relative to its simplicity and low cost of construction and operation.

While the electric motor of the present invention finds particular utility in low cost electric meters and relays, those skilled in the art will appreciate that the invention is useful in many other devices where size and cost are important factors.

Many of the indicating meters now on the market are used for precise measurements of current flow or of some condition which is represented by current flow. Where a high degree of accuracy is required, the meter movement necessarily is of the precision, high cost type. However, there are numerous areas of use where qualitative rather than quantitative measurements are sufficient. Thus, in inexpensive light meters, tube testers, sound level meters, electrical toys and games and household measuring devices of the galvanic action type, just to name a few of such areas, it is desirable to avoid the high costs of construction inherent in precision motor movements and to substitute therefor a simpler and less expensive indicating meter of fairly high accuracy and sensitivity.

Accordingly, it is a general object of this invention to provide a new and improved meter movement of low cost and relatively high sensitivity.

It is another object of this invention to provide a new meter movement having considerable economy of construction and use, which is achieved in part by the small number of operating parts required.

The above and other objects of this invention are realized in accordance with a novel meter movement having a small disc-shaped permanent magnet of resilient base material pivotally mounted in an electrical coil arrangement particularly shaped to provide optimum flux concentration. The pivot pin for the magnet is eccentrically positioned in off-set relationship with respect to the magnet center to permit counter-balancing of the indicating means attached to the magnet, and further to provide a zero return for such indicating means. Advantageously, the eccentric or off-center position of the pivot pin in the magnet is selected to compensate for the position and weight of the indicating means utilized and to provide for the sensitivity of movement required.

Thus, it is an object of this invention to provide a new meter movement construction as described above, having a high mass, one-piece resilient base magnet armature pivotally mounted in an off-center assembly to compensate for the weight of the attached indicating means and to provide a zero return for such indicating means.

It is a further object of this invention to provide such a compact eccentrically mounted magnet armature capable of developing a torque substantially high to enable the meter movement to be used with large flag-type indicators, relay applications and other high torque motor requirements.

It is a still further object of this invention to provide such a new and improved eccentrically mounted magnetic armature meter movement which is notable for the relatively compact size and high torque characteristics achieved in a low cost construction.

The novel features which are characteristic of the invention are set forth with particularity in the appended claims. The invention itself, however, both as to its organization and operation, together with further objects and advantages thereof, will best be understood by reference to the following description taken in conjunction with the accompanying drawings in which:

Figure 1:
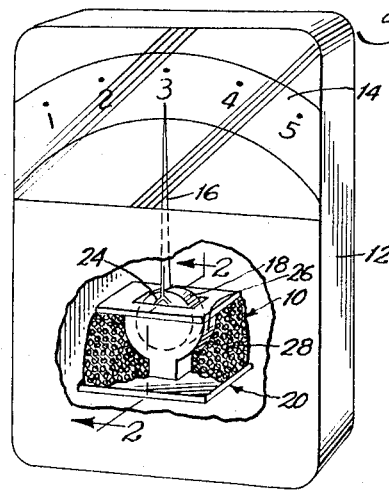
FIGURE 1 is an illustrative view of an indicating meter which has parts broken away to show the details of the novel off-center meter movement embodying the present invention.
Figure 2:
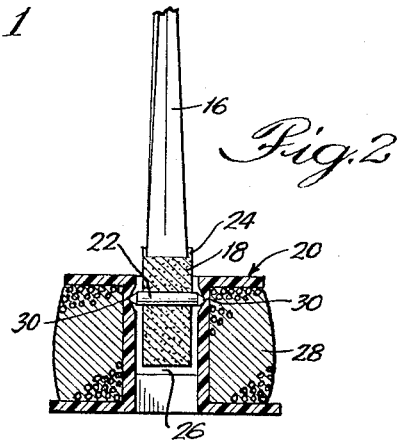
FIGURE 2 is a cross-sectional view of the meter movement taken substantially as shown along line 2—2 of FIGURE 1.

Referring now to the drawing, and more particularly to FIGURES 1 and 2 thereof, there is illustrated one type of low cost, high torque meter movement embodying the invention. FIGURE 1 illustrates the novel meter movement 10 as utilized in connection with the indicating meter 12 having an indicating scale 14 with suitable indicia marked thereon. An elongated indicating pointer 16 extends from the meter movement 12 into indicating relationship with the scale 14 to provide visual indications of the energizing current flow through the meter movement.

As shown in greater detail in the broken portion of FIGURE 1 and in the sectional view of FIGURE 2, the meter movement of the present invention advantageously comprises a disc-shaped magnet armature 18 eccentrically mounted for pivotal movement in a plastic bobbin 20. In one particular embodiment of the invention the magnet armature comprises a disc of permanent magnet material in a base of non-conductive material. For example, the magnet armature 18 may be formed of sintered ceramic and iron oxide, such as Indox, or in the alternative, the magnet armature 18 may be formed of an iron oxide ferrite with a resilient vinyl or rubber base. Both types of material are known to those skilled in the art, and whether the iron oxide is utilized with a sintered ceramic, or a plastic such as rubber or vinyl, the non-conductive base material merely serves as a binder to hold the iron oxide compound so as to provide the desired magnetic properties.

Advantageously, the magnet armature 18 is eccentrically mounted in a plastic bobbin 20 by means of a pivot pin 22 positioned through the magnet armature at a point which is off-set relative to the central axis of the magnet armature. Thus, as particularly shown in FIGURE 2 of the drawing, the pivot pin 22 is positioned in off-set relationship from the natural central axis of the magnet armature 18 such that a greater mass portion of the magnet armature is provided at one side of the pivot pin and a lesser mass portion of the magnet armature is provided at the other side of the pivot pin.

Due to the eccentric mounting of the pivot pin in the magnet armature 18, the magnet armature 18 may be provided with a relatively large indicator pointer 16 since the latter is counter-balanced by the greater mass portion of the magnet armature. In addition, this eccentric arrangement provides a zero return for the indicator pointer 16 when the indicator pointer is attached to the magnet armature at the zero return point.

Thus, the indicator pointer 16 may be attached to the magnet armature 18 by any suitable means, as for example, a suitable adhesive when the magnet armature takes the form of a ceramic magnet. When the magnet armature takes the form of a resilient base magnet which may easily be cut, it is advantageous to provide the magnet armature 18 with a suitable Y-shaped slot shaped to receive the Y-shaped base 24 of the indicator pointer so that the latter may be positioned into the magnet armature slot and firmly held therein.

In accordance with a further feature of this invention, the bobbin 20 is particularly shaped to conform to the curvature of the magnet armature 18. Thus, as shown in FIGURE 1, the bobbin 20 is curved as at 26 to conform to the curvature of the magnet armature 18 and to permit the coil of wire 28, wound around the bobbin 20 to be closely spaced to the magnet armature 18. This arrangement results in concentrating the magnetic flux at the magnetic armature and in distributing the lines of flux thereat in a desired fashion so as to optimize the response of the meter movement to the energizing current.

In the operation of the meter movement described above, the terminals of the electric coil 28 are connected to a suitable source of electric current. When the current flows through the coil 28, the coil becomes an electromagnet in accordance with well-known principles and develops two magnet poles which attract or repel the magnetic poles of the magnet armature 18. Since the magnet poles on the magnet armature 18 attempt to align themselves with the magnetic poles produced by the energized coil 28, the magnet armature 18 is rotated an amount dependent upon the amplitude of electrical energizing current. The indicating pointer 16 connected to the magnet armature 18 provides an indication of such energizing current.

In the illustrative embodiment of FIGURES 1 and 2, the pivot pin 22 is shown as pivotally mounted in the bearing recesses 30 formed in the plastic bobbin 20. This particular construction is characterized by its simplicity and low cost since all of the parts may be formed of plastic with the exception of the pivot pin 22 and the wire coil 28. Due to the resilience of the plastic bobbin, the meter movement may be assembled merely by press fitting the pivot pin 22 within the bobbin until it snaps into place at the bearing recesses 30.

Figure 3:
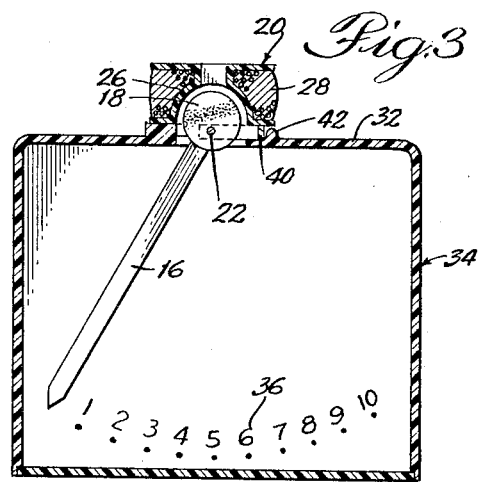
FIGURE 3 illustrates another type of indicating meter embodying an alternative off-center meter movement constructed in accordance with the invention.
Figure 4:
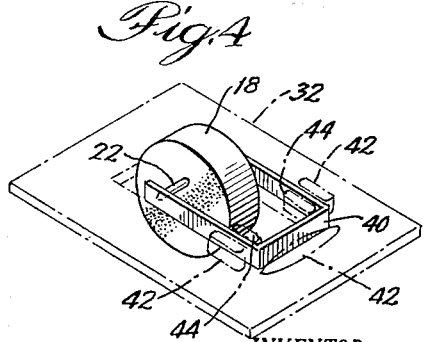
FIGURE 4 is a perspective view of an off-set magnet armature and yoke assembly utilized in the meter movement of FIGURE 3.

Another illustrative embodiment of the invention is illustrated in FIGURES 3 and 4 of the drawing. In this particular embodiment, the bobbin 20 and electrical coil 28 assembly is similar to that described hereinabove, with the bobbin 20 being shaped to conform to the curvature of the magnet armature 18. It has been found advantageous to utilize the meter movement of the present invention in an indicating meter of the type shown in FIGURE 3 wherein the meter movement is positioned at the top wall 32 of the meter housing 34. An indicating scale 36 is marked at the lower portion of the meter housing 34 and is associated with a relatively long indicator pointer 16 which is attached to the armature magnet 18, as described above.

This particular mounting arrangement of the meter movement provides several unique advantages. Due to the eccentric positioning of the pivot pin 22 in the armature magnet 18, the relatively long indicating pointer 16 is counter-balanced by the greater mass portion of the electromagnet located above the pivot pin 22. Not only does this arrangement simplify the counter-balancing of the indicator pointer 16, but in addition, it provides better damping of the pointer movement as it eliminates the possibility of off-center instability and oscillation which may occur with an upwardly mounted meter movement. Still further, this particular arrangement enables the use of larger indicating pointers to facilitate and enhance the visual readability of the meter indication.

The structure of FIGURES 3 and 4 illustrate a still further technique for the pivotal mounting of the armature magnet in the bobbin. Thus, in lieu of the press-fitted pivot pin illustrated in FIGURE 2, the pivot pin 22 in this embodiment may be pivotally mounted in a U-shaped yoke 40 of a suitable non-magnetic material. The plastic housing of the meter advantageously is molded with suitable bosses, such as that indicated at 42 and 44 in FIGURE 3 which are located to receive the arms of yoke 40 to guide the meter movement assembly in position during assembly.

Those skilled in the art will appreciate the many advantages in this arrangement since, during assembly, the magnet armature and yoke sub-assembly may be dropped into place over the guide bosses, and then the bobbin and coil sub-assembly may be dropped into place thereover with the latter being firmly secured to the meter housing by suitable adhesive or the like. Thus, it is clear that the relatively small number of operating parts together with the relatively low costs of such parts and the assembly thereof, results in an efficient, high torque, yet economical meter movement.

Figure 5:
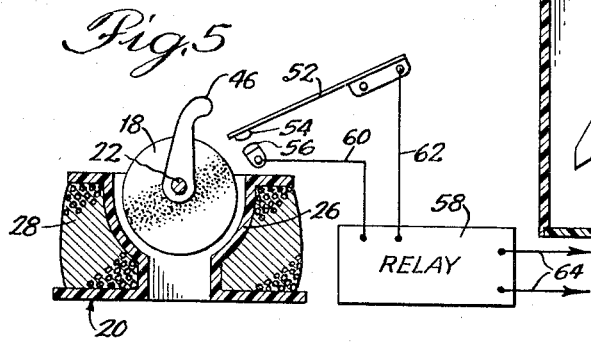
FIGURES 5 and 6 are views, partly in schematic and partly in sectional form, illustrating the meter movement of the invention as used in an electrical relay circuit.
Figure 6:
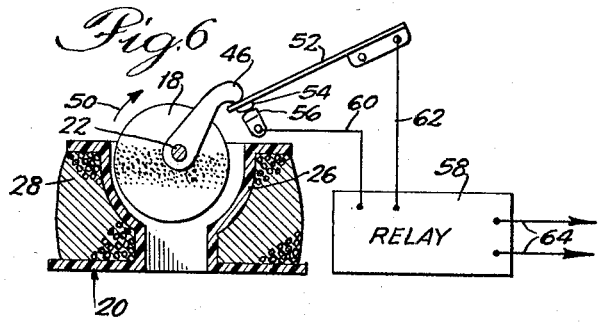

If desired, the high torque provided by the meter movement of the present invention may be utilized in other applications, as for example, in electrical relay circuits. Such an embodiment is illustrated in FIGURES 5 and 6 of the drawing wherein the particularly shaped bobbin 20, electrical coil 28 and armature magnet 18 are similar to those described hereinabove. As before the, pivot pin 22 of the armature magnet is eccentrically mounted with its axes off-set from the normal central axis of the armature magnet. In this particular embodiment, a contact actuating arm 46 is utilized in the place of the indicating pointer formerly described with respect to an indicating metre. Arm 46 normally is held in the upright position shown in FIGURE 5 due to the counter-balancing effect of the larger mass portion of armature magnet 18. When the coil 28 is energized, the armature magnet 18 is rotated as shown by the arrow 50 to cause the arm 46 to come into contact with a switch blade 52. The switch blade 52 carries the contact 54 which is pressed into engagement with the stationary contact 56 to complete an electrical circuit to the relay 58 by means of the conductors 60 and 62.

Manifestly, the relay 58 may be connected by the conductors 64 and 66 to any suitable utilization device which is adapted to be responsive to the closing of contacts 54 and 56. When the energizing current in the coil 28 ceases, the gravitational sources upon the armature magnet 18 returns the arm 46 to the upright position shown in FIGURE 5 and the relay circuit is re-opened. Manifestly, the switch blade 52 may be formed of any suitable resilient material to permit it to spring back to its normal position upon release by the arm 46.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a compact, high torque meter movement comprising an armature disc formed of permanent magnet material in a resilient binder base, said armature disc being magnetized to define a pair of magnetic poles through its diameter, a bobbin having a recess portion for receiving said armature disc, said bobbin being shaped to conform to the curvature of said armature disc, a coil of electrically energizable wire wound around said bobbin and having a pair of terminals adapted for connection to a source of energizing current, horizontal pivot means for said armature disc connected at a point on said disc which is off-set relative to the central axis of said disc whereby a greater mass portion of said disc is located at one side of the pivot point and a lesser mass portion of said disc is located at the other side of said pivot point, said pivot means being rotatably mounted on said bobbin to permit said armature disc to be rotated in a vertical plane an amount dependent upon the electrical energizing current in said coil, and indicating means connected to the lesser mass portion of said armature disc whereby the weight of said indicating means is counter-balanced by the greater mass portion of said armature disc to provide a zero return for said indicating means when there is no current flow in said coil.

2. The improvement of a compact, high torque meter movement comprising an armature disc formed of permanent magnet material in a resilient binder base, said armature disc being magnetized to define a pair of magnetic poles through its diameter, a bobbin having a recess portion for receiving said armature disc, said bobbin being shaped to conform to the curvature of said armature disc, a coil of electrically energizable wire wound around said bobbin and having a pair of terminals adapted for connection to a source of energizing current, and horizontal pivot means for said armature disc connected at a point on said disc which is off-set relative to the central axis of said disc whereby a greater mass portion of said disc is located at one side of the pivot point and a lesser mass portion of said disc is located at the other side of said pivot point, said pivot means being rotatably mounted on said bobbin to permit said armature disc to be rotated in a vertical plane from its point of rest as determined by the greater mass portion an amount dependent upon the electrical energizing current in said coil.

3. The improvement of a compact, high torque meter movement comprising an armature disc formed of permanent magnet material, said armature disc being magnetized to define a pair of magnetic poles through its diameter, a bobbin having a recess portion for receiving said armature disc, a coil of electrically energizable wire wound around said bobbin and having a pair of terminals adapted for connection to a source of energizing current, eccentrically positioned horizontal pivot means for said armature disc connected at a point on said disc which is off-set relative to the central axis of said disc whereby a greater mass portion of said disc is located at one side of the pivot point and a lesser mass portion of said disc is located at the other side of said pivot point, said pivot means being rotatably mounted on said bobbin to permit said armature disc to be rotated in a vertical plane an amount dependent upon the electrical energizing current in said coil, a pair of normally open electrical switch contacts, and actuating means for said switch contacts extending from said lesser mass portion of said armature disc so as to be counter-balanced by the greater mass portion of said armature disc for closing said electrical switch contacts upon rotation of said armature disc.

4. The improvement of a compact, high torque meter movement comprising an armature disc formed of permanent magnet material in a resilient binder base, said armature disc being magnetized to define a pair of magnetic poles through its diameter, a bobbin having a recess portion for receiving said armature disc, said bobbin being shaped to conform to the curvature of said armature disc, a coil of electrically energizable wire wound around said bobbin and having a pair of terminals adapted for connection to a source of energizing current, horizontal pivot means for said armature disc connected at a point on said disc which is off-set relative to the central axis of said disc whereby a greater mass portion of said disc is located at one side of the pivot point and a lesser mass portion of said disc is located at the other side of said pivot point, said pivot means being rotatably mounted on a yoke, said bobbin having guide bosses for receiving said yoke to permit said armature disc to be rotated in a vertical plane in the bobbin recess portion an amount dependent upon the electrical energizing current in said coil, and indicating means connected to the lesser mass portion of said armature disc whereby the weight of said indicating means is counter-balanced by the greater mass portion of said armature disc.

5. The improvement of an indicating meter assembly in accordance with claim 4 further comprising elongated indicating means depending from said armature disc for rotation therewith, said elongated indicating means being connected to the lesser mass portion of said armature disc whereby the weight of the indicating means is counter-balanced by the greater mass portion of said armature disc, and an indicating scale at the lower portion of said meter housing in indicating relation with said indicating means.

References Cited by the Examiner

UNITED STATES PATENTS

| 2,430,465 | 11/1947 | Grady | 324—146 |
| 2,524,841 | 10/1950 | Simkins | 324—146 |
| 2,861,140 | 11/1958 | Woodall | 324—157 |
| 2,883,596 | 4/1959 | Boyd | 324—146 |
| 2,939,078 | 5/1960 | Hastings | 324—146 |
| 2,978,639 | 4/1961 | Lawson | 324—146 |

FOREIGN PATENTS 151,923  8/1920  Great Britain.

WALTER L. CARLSON, *Primary Examiner.*

BENNETT G. MILLER, *Examiner.*

R. V. ROLINEC, *Assistant Examiner.*